United States Patent
Kitano et al.

[11] 3,830,640
[45] Aug. 20, 1974

[54] PRODUCTION OF LIGHT-CONDUCTING GLASS STRUCTURES WITH INDEX GRADIENT

[75] Inventors: Ichiro Kitano, Kobe; Ken Koizumi, Kawanishi; Yoshiro Ikeda, Nishinomiya; Hiroyoshi Matsumura, Ashiya, all of Japan

[73] Assignee: Nippon Selfoc Kabushiki Kaisha (a/k/a Nippon Selfoc Co., Ltd.), Tokyo-to, Japan

[22] Filed: Dec. 4, 1972

[21] Appl. No.: 311,947

Related U.S. Application Data

[63] Continuation-in-part of Ser. No. 7,855, Feb. 2, 1970, abandoned.

[30] Foreign Application Priority Data
  Feb. 2, 1969  Japan.................................. 44-8886
  Mar. 18, 1969  Japan............................... 44-21137

[52] U.S. Cl................................ 65/30, 65/3, 65/4, 65/2, 65/111, 65/DIG. 7, 350/96 WG, 350/175 GN
[51] Int. Cl.... C03b 29/00, C03b 25/02, G02b 3/00
[58] Field of Search.......... 65/4, DIG. 7, 3, 30, 111, 65/2; 350/96 WG, 175 GN

[56] References Cited
UNITED STATES PATENTS
3,227,032  1/1966  Upton....................................... 65/4
3,253,896  5/1966  Woodcock et al........................ 65/4
3,614,197  10/1971 Nishizawa et al......................... 65/4

*Primary Examiner*—Frank W. Miga
*Attorney, Agent, or Firm*—Robert E. Burns; Emmanuel J. Lobato; Bruce L. Adams

[57] ABSTRACT

A light-conducting glass rod is passed continuously through a furnace wherein it is heated to a temperature above its softening point and is stretched into a thin filament. The rod has a refractive index gradient in any transverse cross-section such that the index decreases progressively or continuously from the central axis outward towards the periphery and this gradient is increased in the filament by the stretching. The heating and stretching may also be carried out by concentrically disposing a glass tube around the light-conducting glass rod and evacuating the interior of the glass tube to thereby produce a light-conducting filament having a covering layer. The filament thus produced may be subjected to a simple thermochemical treatment to increase its strength and several pieces of the filament may be bundled together to produce an ommateal lens.

10 Claims, 10 Drawing Figures

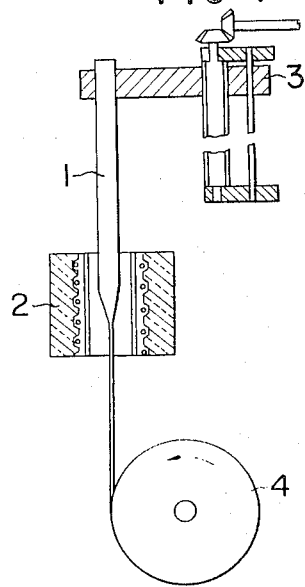
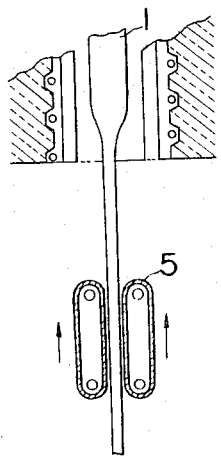
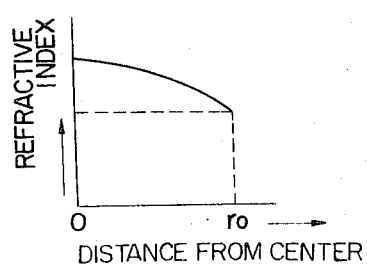
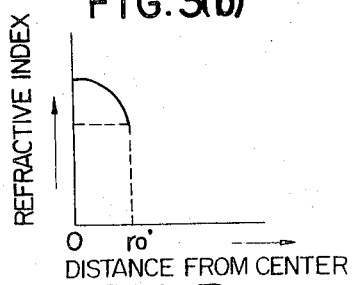
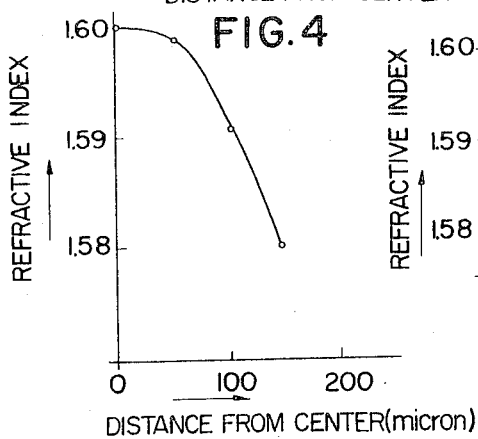
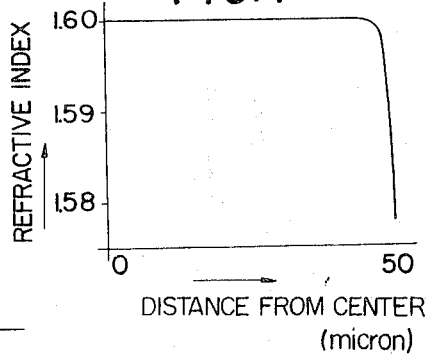
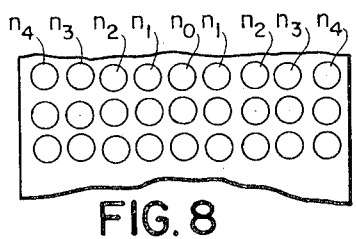
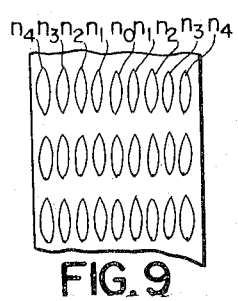

PRODUCTION OF LIGHT-CONDUCTING GLASS STRUCTURES WITH INDEX GRADIENT

This application is a continuation-in-part of application Ser. No. 7,855 filed Feb. 2, 1970 and now abandoned.

BACKGROUND OF THE INVENTION

This invention relates generally to light-conducting materials and structures and more particularly to a new and improved process for producing light-conducting filaments each having a refractive index distribution in any transverse cross-section extending transverse to the intended direction of advancement of light through the filament such that the refractive index varies progressively or continuously from the center of the filament toward the outer surface of the filament.

Recently, there has been an intensification of research relating to light communication through the use of light emissions such as laser light, and various techniques for providing light-conducting paths for such light communication have been and are currently being proposed. Among these proposals, there is one by Seiji Uchida described in a publication entitled "Laser Applications" from the preprints of the symposium of the national convention for the Fiftieth Anniversary of the Founding of the (Japan) Electronic Communication Society and published during October, 1967 (ppg. 3, 4) in which the utilization of the glass body whose refractive index decreases proportionally with the square of the distance from the central axis of the glass body for light-conducting paths or parts thereof is described.

The realization of a light-conducting path of this character has been looked forward to with high expectancy because of its advantageous features such as its high resistance to the detrimental effects of the atmosphere and other external influences and the possibility of forming such paths from flexible or bendable materials. However, a process for producing ligh-conducting glass structures having such a refractive index distribution has heretofore been unknown. Consequently, such a light-conducting path or medium has not been reduced to practice.

In addition, so-called gas lenses have heretofore been known. For example, in the Bell System Technical Journal, Mar. 1965 issue, pp. 465 – 467, it is stated that a gas body or some other transparent body having a refractive index decreasing or increasing in proportion to the square of the distance from the body center line may function as a lens. However, a transparent structure having such a refractive index distribution and thereby functioning as a lens for practical purposes has not yet been developed.

As disclosed in U.S. Pat. application Ser. No. 806,368 filed on Mar. 12, 1969 and now abandoned in favor of continuation application Ser. No. 147,256 filed on May 26, 1971, we have previously proposed a process for producing a light-conducting glass structure which process comprises contacting a glass body containing ions, for example, thallium ions, which are cations capable of constituting modifying oxides and having a light degree of contribution to the refractive index of glass with a salt containing ions, for example, ions of an alkali, which are other cations capable of constituting modifying oxides and have a lower degree of contribution to the refractive index of glass than the first mentioned ions, whereby the refractive index of the glass body is caused to vary progressively from the contact surface or outer surface toward the glass interior.

By appropriately selecting the contact temperature and the time duration of contact between the glass body and the salt in the practice of this production process, the resulting glass structure can be caused to have, in any cross-section, a refractive index distribution from the center toward the periphery which is very close to a quadratic or second-degree distribution. In the case where the refractive index decreases in accordance with the quadratic distribution from the center toward the periphery, a laser light-conducting structure suitable for time division multiplexing and space division multiplexing communication can be produced. When lens action is an object, a lens having flexibility or a lens having a very short focal length can also be obtained.

In many cases wherein a glass structure of the above described character is to be used as a light-conducting path for laser communication or as a thin elongated structure for conducting images, the flexibility desired of the glass structure is such that it can be curved to a radius of curvature which is at most a number of centimeters. In order for the fibrous glass as described above to have sufficient strength, the diameter thereof must be less than 200 microns. Furthermore, in the case where a large number of the above described fibrous glass structures are combined to form a flexible compound-eye lens or ommateal lens, for example, for use in reproducing three-dimensional images of objects which are not directly visible, extremely thin fibrous glass structure become necessary.

However, the production of such fibrous glass structures having a fine diameter by the production process set forth in the above cited patent application has not been possible heretofore because of the difficulty of carrying out the process of immersing and holding the very thin elemental glass fibers in a molten salt for a long time at a high temperature without breakage of the fibers.

On the other hand, for carrying out the process of immersing and holding the fibers in a motionless state in a molten salt, both as specified in the above mentioned patent application for the purpose of producing light-conducting structure of long length to function as light-conducting paths in light communication, it is necessary to prepare a molten salt bath vessel of very long length and consequently the adoption of this production process is not economical.

Furthermore, the strength of a glass structure produced in accordance with the process set forth in the above cited patent application becomes lower than that prior to the salt immersion process because of the development of minute faults in the glass surface due to this process. One possible explanation for this result is that ions of large ion radius escape from the glass surface into the salt, while ions of small ion radius infiltrate from the salt into the glass interior, whereby minute faults existing dormantly or potentially in the glass surface become prominent before the glass structure can become full stabilized.

Another difficulty accompanying glass structures produced by the process of the above mentioned patent application is that the chemical durability thereof cannot be said to be fully satisfactory because they contain a substantial quantity of alkaline metal ions whereby there is the possiblity of "tarnishing or iridescence" appearing on the glass surface when the structure is left for a long time in an atmosphere of high humidity.

Still another difficulty accompanying this glass structure is that, since it does not have at its surface a light-absorbent glass layer, a portion of incident light entering the glass structure an angle greater than the aperture angle undergoes total reflection at the glass surface and is thus conducted, whereby there arises difficulties such as optical noise and lowering of image contrast.

A further difficulty accompanying this glass structure produced by the process specified in the above cited patent application is that when an attempt is made to form a densely compacted bundle of such glass structures, such as when forming an ommateal lens by mutual fusion bonding of glass structures, deformation of the glass structures tends to occur during maximum density filling. As a result, the angular isotropy of the refractive index of the glass structure in the radial direction in a cross section threof becomes disrupted and the lens action is impaired so that it is difficult to produce a ommateal lens of good quality.

SUMMARY OF THE INVENTION

It is an object of the present invention to provide an improved process for producing light-conducting structures of glass and other transparent materials for suitable light communication which could not be realized heretofore and for producing lens-action structures of glass and other transparent materials having desirable refractive index distributions, none of which are accompanied by the above described difficulties.

Another object of the present invention is to provide a process for producing glass light-conducting structures having fine diameters and long lengths which could not be easily produced heretofore for the afore-described reasons.

Still another object of the invention is to provide a process for producing light-conducting glass structures having the aforedescribed refractive index distribution and having a covering layer around the outer peripheral parts thereof for overcoming some of the above described difficulties.

According to one aspect of the present invention, briefly summarized, there is provided a process for producing a light-conducting filament structure having a refractive index gradient such that the refractiv index in any cross-section perpendicular to the central axis of the structure decreases progressively from the center outward toward the surface, which process is characterized by the steps of heating a filament or rod composed of transparent material having a progressively varying refractive index gradient similar to that described above from one end thereof toward the other end to a temperature at which the transparent material can be plastically deformed and, at the same time, continuously stretching the filament or rod in the longitudinal direction at a variably settable stretching speed to reduce the cross-sectional dimensions of the filament or rod by a specific proportion, and, moreover, the original refractive index gradient in each cross-section thereof is increased by a specific proportion.

According to another aspect of the present invention, there is further provided a process for producing a light-conducting glass structure having a covering layer, which process is characterized by the steps of disposing a tubular glass structure substantially concentrically about the outer part of a light-conducting glass structure of rod shape or filament shape having a refractive index distribution in each cross-section perpendicular to the central axis thereof wherein the refractive index decreases progressively or continuously from the central axis toward the outer periphery simultaneously stretching the two glass structures in their axial direction while the interior of the tubular structure is maintained in an evacuated state, and maintaining both the tubular structure and the glass body at a temperature at which both can be plastically deformed to cause the two glass structure to adhere to each other.

The nature, principles, details, advantages and utility of the invention will be more clearly apparent from the following detailed description beginning with general considerations and concluding with specific examples of actual experiments illustrating preferred embodiments of the invention.

BRIEF DESCRIPTION OF THE DRAWINGS

In the drawings:

FIG. 1 is a diagrammatic side view, partly in longitudinal corss-section, showing the essential parts of one type of apparatus for heating and stretching a glass structure according to the processing of the invention;

FIG. 2 is a diagrammatic side view, partly in longitudinal cross-section showing a part of another type of apparatus for heating and stretching a glass structure;

FIGS. 3(a) and 3(b) are graphical representations of examples of refractive index distributions in a transverse cross-section of a glass structure repectively before and after the heating and stretching process according to the invention;

FIG. 4. is a graphical representation indicating the refractive index distribution in the radial direction in a transverse cross-section of a glass structure produced by the heating and stretching process of the invention;

FIGS. 6 and 7 are graphical representations indicating refractive index distributions in the radial direction in a transverse cross-section of a glass structure respectively before an after a treatment process according to the invention;

FIGS. 8 and 9 are explanatory views showing how the refractive index gradient is varied in accordance with the process of the invention.

DETAILED DESCRIPTION OF THE INVENTION

Figure 5:
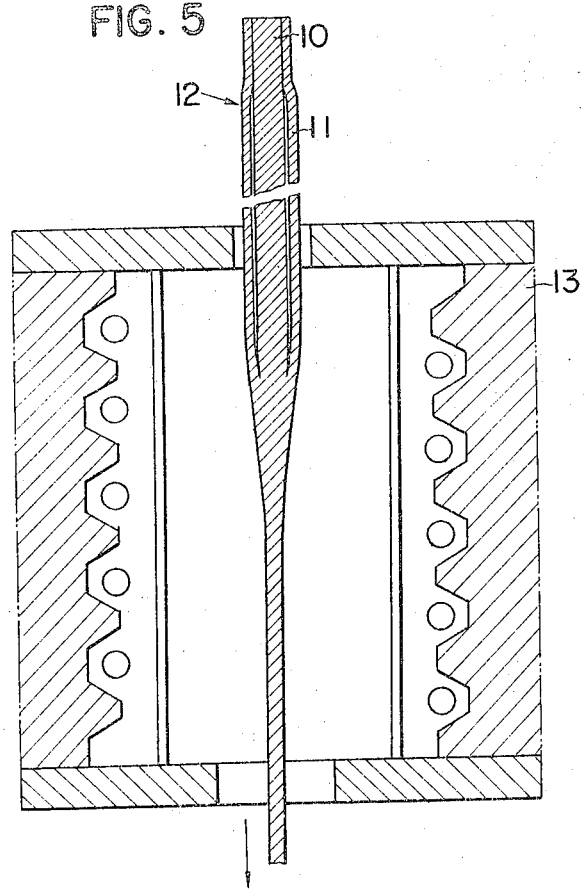
FIG. 5. is an enlarged side view in longitudinal cross-section showing one manner in which a concentric assembly of a glass core rod and an outer glass tube is heated and stretched into a light-conducting glass structure having a covering layer.

In accordance with one aspect of the process of the invention, a transparent material such as a glass structure is heated in a heating zone to a temperature at which the transparent material can be plastically deformed and is stretched. This temperature is herein defined as a temperature within a range of temperatures at which the viscosity of the material is from $10^{3.5}$ poise to $10^{7.5}$ poise. In the case of a glass, this temperature range is higher than the softening point and lower than the gathering temperature of the glass. For example, the softening point is approximately 540° C. and the gathering temperature is approximately 975° C. in the case of a glass composed, by weight, of 16 percent of $Tl_2O$, 24 percent of PbO, 12 percent of $Na_2O$, and 48 percent of $SiO_2$.

Referring first to FIG. 1, the starting material used in the process of the invention comprises a glass rod 1 having a refractive index distribution such that the index decreases progressively from the center toward the outer periphery in any transverse cross-section of the rod. The glass rod 1 may be prepared by a process such as that described in the patent application referred to hereinbefore.

The glass rod 1 is heated at one end by an electric heating furnace 2 for carrying out the heating and stretching process and the furnace interior can be maintained at a temperature ordinarily from 500° to 1,000° C. so that the glass rod 1 can be deformed.

The end of the glass rod 1 thus heated in drawn and stretched by a tensile force applied thereto by a take-up drum 4 which also functions to wind-up the glass filament after same has been stretched and the diameter of the glass rod has accordingly been reduced.

The glass rod 1 is held at its other end and controllably fed by a feed mechanism 3 and the feed mechanism feeds the glass rod progressively into the furnace 2 in a manner such that the part of the glass rod which is being stretched is maintained substantially at a specific fixed position in the furnace.

The glass rod 1 having the above described refractive index distribution and thus fed by the feed mechanism 3 into the furnace 2 is thereby progressively heated along its longitudinal direction from the downstream end to the upstream end. As a result of the action of the take-up drum 4 and winding up the downstream end of the glass rod, the glass rod is reduced in diameter while its refractive index distribution remains intact except for the refractive index gradient which is varied.

That is, during this process, the original pattern of the refractive index distribution is not lost, and, by appropriately selecting beforehand the composition of the glass rod, the difference $\Delta n$ between the refractive indexes at the central portion and the peripheral portion of the glass rod can be maintained substantially the same before and after the stretching step. However, the refractive index gradient within the glass rod is increased by a specific proportion relative to that of the original glass rod 1 and this is explained in more detail hereinafter with reference to FIGS. 8 and 9.

In another embodiment of the invention as illustrated in FIG. 2, the drawing force is imparted to the downstream end of the glass rod by a drive mechanism 5 comprising a pair of endless belts clamping and driving the stretched glass structure therebetween, this drive mechanism being used in place of the take-up drum 4 in the apparatus shown in FIG. 1. The endless belt mechanism is preferable in cases where the glass rod is to be stretched into a filament of large diameter which would otherwise require a take-up drum of extremely large diameter.

The principal features of utility and the numerous advantage of a light-conducting glass structure produced by the process of the invention will now be described.

In a light-conducting glass structure wherein the refractive index progressively varies in directions transverse to the intended direction of advance of the conducted light, utilization is made of the principle whereby the light advances as its path is progressively curved toward the direction in which the refractive index increases in the refractive index distribution transverse to the direction of light advance. The nature of this light conduction is based on and conforms with a well-known law expressed by the equation $$1/p = 1/n \, dn/dN \qquad (1)$$

Where:
  $p$ is the radius of curvature of the curved light ray path;
  $n$ is the refractive index of the medium; and
  $dn/dN$ is the variation or gradient of the refractive index in the direction perpendicular to the tangential direction of the light ray path.

Accordingly, an incident light ray entering in the longitudinal direction at one end of an elongated light-conducting glass structure having a refractive index distribution in each cross-section thereof wherein the index decreases progressively from the center toward the outer periphery is caused to advance in an undulating path about the central axis of the glass structure, provided the incidence angle of the light ray is within a certain range of incidence angles.

Particularly in the case where the refractive index distribution in any cross-section of the structure conforms to the equation $$n = n_0 (1 - ar^2) \qquad (2)$$

where: $n_0$ is the refractive index at the center $n$ is the refractive index at a distance $r$ from the center and $a$ is a positive constant, the glass structure is applicable to new and heretofore untried uses such as that for conducting paths in laser light communication capable of time division multiplexing and space division multiplexing and as image-conducting structures equivalent to lenses.

To more fully understand the principles and to facilitate an understanding of the invention, assume that an incident light ray enters a glass structure of a length Z and having such a refractive index distribution at one end surface thereof at a position $r = r_1$ and with the angle $P = P_1$ with respect to the central axis in a plane joining the center and $r_1$ leaves the glass structure at the other end surface thereof at a position $r = r_2$ and an angle $P - P_2$ with respect to the central axis as represented by the following matrix.

$$\begin{pmatrix} r_2 \\ P_2 \end{pmatrix} = \begin{pmatrix} \cos(\sqrt{2a}Z) & \frac{1}{2a}\sin(\sqrt{2a}Z) \\ -\sqrt{2a}\sin(\sqrt{2a}Z) & \cos(\sqrt{2a}Z) \end{pmatrix} \begin{pmatrix} r_1 \\ P_1 \end{pmatrix} \qquad (3)$$

Accordingly, it will be apparent that even if the incidence position and incidence angle are different at the entrance end surface, incident light rays entering the surface at the same time advance in sinusoidal waves of equal wavelength in which there are no phase variations. While the light rays generally follow helical light paths undulating about the central axis, their phases are preserved even in this case, and the periodicity is not lost.

When a thin and flexible light-conducting glass structure produced in accordance with the invention is bent into a curved shape, the central axis of the glass structure is displaced toward the outer side only by an apparent displacement $\Delta$ represented by the following equation in terms of the radius of curvature R of the curve.

$$\Delta = 1/2aR \qquad (4)$$

Accordingly, the laser light-conducting characteristic and the image-conducting characteristic of the structure are retained for all practical purposes.

The focal length of the structure as a lens-action structure is represented by the following equation.

$$f = \{No \; \sqrt{2a} \sin ( \sqrt{2a}\, Z)\}^{-1} \qquad (5)$$

When $m$ is a positive integer, a lens of very short focal length can be obtained with a length $Z$ close to that given by the following equation.

$$Z = 1/2 \; \sqrt{2a} \cdot (2m-1)\pi \qquad (6)$$

To more clearly understand the aforementioned principles, it is assumed that a glass fiber is fed at a speed $V_1$ into the heating zone, and drawn out of the heating zone at a speed $V_2$ which is higher than $V_1$, the diameter of the glass fiber is reduced and, as a result, the value of $a$ increases. For instance, when the ratio $V_2/V_1$ is 4, the diameter of the fiber to be obtained will be half of the original one and the value of $a$ will 4 times the original one. When the ratio $V_2/V_1$ is 9, the diameter will be one third and the value of $a$ will be 9 times.

Further, the refractive indexes at the center and the surface of the fiber before the stretching step will remain substantially unchanged after the stretching.

These features can be visualized more clearly by examining FIG. 8 and FIG. 9 of which each is a conceptional indication of the refractive index distribution within a glass fiber on a plane along the axis before stretching FIG. 8 and after stretching FIG. 9.

In FIG. 8, the refractive index distribution is indicated by rows along the axis of hypothetical minute glass spheres. Each of the spheres has a uniform refractive index throughout and the spheres in each row have the same refractive index, but among the rows the refractive index varies from $n_0$ to $n_4$.

After the glass fiber is stretched, as shown in FIG. 9, each of the spheres is deformed into an ellipsoid, but the refractive index of each sphere remains unchanged. Thus, the refractive indexes at the center and the surface of the fiber, $n_0$ and $n_4$, remain unchanged while the refractive index gradient is increased.

Further, if the radius of the glass fiber is R and the refractive index at the surface of the glass fiber is N, a substitution of the symbols $r$ and $n$ by R and N, respectively, in the equation $n = n_0 (1-ar^2)$ for the refractive index variation yield:

$$N = n_0 (1 - aR^2)$$

This equation may be transformed to give:

$$a = n_o - N/n_o R^2$$

Since stretching of the glass fiber produces no variation in $n_o$ and $N$ but only a reduction in the radius of the fiber, the following equations may be obtained:

$$a_1 = n_o - N/n_o \cdot 1/R_1^2,$$

and $$a_2 = n_o - N/n_o \cdot 1/R_2^2$$

wherein $a_1$ and $R_1$ and $a_2$ and $R_2$ are values of $a$ and R before and after stretching, respectively, and which may be simplified to give:

$$a_1/a_2 = (R_2/R_1)^2$$

Thus, stretching of the glass fiber wherein $V_2/V_1$ is larger than one (unity) results in a reduction of $R_1$ and $R_2$ which in turn results in increase in $a_1$ to $a_2$ according to the equation $a_1/a_2 = (R_2/R_1)^2$.

The reason why stretching of the glass fiber wherein $V_2/V_1$ is larger than one (unity) results in reduction of $R_1$ to $R_2$ is as follows:

The volume of the glass fiber fed to the treating zone per unit time is the same as that withdrawn out of the zone, and thus $R_1^2 \cdot V_1 = R_2^2 \cdot V_2$, which gives:

$$R_2/R_1 = \sqrt{V_1/V_2} .$$

Thus, when the ratio $V_2/V_1$ is 4, the radius $R_2$ of the stretched glass fiber is one-half of the original $R_1$.

The heating temperature and the time duration which the glass fiber is heated in the heating zone should be selected so that no microscopic refractive index variations occur, such as by diffusion of ions within the glass. Too high a heating temperature and too long a heating time will produce diffusion of ions which will in turn produce an undesired refractive index variation.

Since the light-conducting glass structure of the invention can constitute a lens-action structure having flexibility and a long thin configuration, it can be used not only as a single structure but also in the form of a bundle of a large number of glass structures which form gives rise to new uses. For example, a glass structure comprising a large number of the elemental structures of the invention transformed into a mutually integral bundled structure by a procedure such as bonding together only the two end parts thereof is capable of functioning as a flexible ommateal lens, which can be advantageously and effectively used in applications such as the reproduction of three-dimensional images of objects in locations which are not directly visible.

The principal uses of the light-conducting structure of the invention are its uses as a highly flexible light-conducting path, as a lens of very thin diameter, as a highly flexible lens, and as an ommateal lens. In addition, the following applications of the glass structure are possible.

The production of a glass rod structure wherein in any crosssection thereof the refractive index decreases comparatively rapidly outwardly in regions in the vicinity of the outer periphery can be readily accomplished by the production process set forth in the aforementioned patent application. In accordance with the process of the present invention, it is possible to heat and stretch such a glass rod into a filament of a fine diameter of the order of a few microns to several tens of microns whereupon a new type of optical filament of fiber is obtained.

A conventional optical fiber is composed of two concentric layers as viewed in cross-section, that is, a core portion having a relatively high refractive index and a covering layer portion having a relatively low refractive index with an interface between the two portions and the total reflection of light at this interface is utilized to conduct light. In contrast, in the light-conducting glass filament having a fine diameter according to the invention, refraction of light is utilized to conduct light. The filaments of reduced diameters.

The temperature conditions of this experiment, the refractive indexes $N_{max}$ and $N'_{max}$ at the centers, the refractive indexes $N_{min}$ and $N'_{min}$ at the outer surfaces, and the diameters $d$ and $d'$ of the glass structures respectively before and after the process of heating and stretching are indicated in Table 1. Furthermore, therefractive index distributions of the glass structures before and after the process are indicated in Table 1 by means of the values of $a$ in Equation (2) set forth hereinbefore.

Table 1

| BEFORE PROCESS | | | | HEATING STRETCHING TEMP. (°C) | AFTER PROCESS | | | |
|---|---|---|---|---|---|---|---|---|
| $d$ (mm.) | $N_{max}$ | $N_{min}$ | $a$ (mm$^{-2}$) | | $d'$ (mm.) | $N'_{max}$ | $N'_{min}$ | $a$ (mm$^{-2}$) |
| 1.0 | 1.601 | 1.576 | 0.06 | 800 | 0.59 | 1.600 | 1.577 | 0.17 |
| 0.95 | 1.600 | 1.578 | 0.06 | 850 | 0.30 | 1.600 | 1.579 | 0.6 |
| 0.98 | 1.601 | 1.577 | 0.06 | 850 | 0.2 | 1.601 | 1.578 | 1.4 |
| 1.10 | 1.600 | 1.577 | 0.05 | 900 | 0.4 | 1.599 | 1.579 | 0.3 |
| 1.00 | 1.601 | 1.578 | 0.06 | 900 | 0.28 | 1.599 | 1.580 | 0.6 | relative performances of these two kinds of optical fibers may be indicated by a comparison of their light quantity losses for transmission through one meter lengths in the following manner.

The conventional optical fiber entails, in addition to losses due to absorption and scattering, a loss due to deviation from the ideal state of total reflection and thus it has not been possible to attain a light transmittance of over 80 percent per one meter of length. In contrast, in the light-conducting filament of the invention, the light transmittance can be easily raised to a value of from 85 to 90 percent and it is even possible to attain values of from 90 percent to a value close to 100 percent.

Accordingly, by using the light-conducting glass fiber of the present invention in place of the conventional optical fibers and bundles of optical fibers in almost all products to which they are applied, it is possible to increase their light transmittance. This effectiveness of the glass fiber or filament of the invention is particularly pronounced in its utilization in so-called fibroscopes of lengths up to a number of meters.

It has been found that in the practice of the process of the invention the refractive index distribution of the glass rod existing prior to the heating and stretching process is not eliminated or impaired by this process, and, move, the degree of the refractive index distribution is not reduced to a great extent. The result of one example of comparison of the refractive index distributions in cross-sections of a glass rod prior to the heating and stretching process of the invention and of the resulting glass filament after the process is indicated in FIGS. 3(a) and 3(b), which respectively indicate the refractive index distributions in the glass rod prior to the process and in the filament after the process.

In one instance of a practical experiment, glass rods having a composition, by weight, of 16 percent of $Tl_2O$, 24 percent of $PbO$, 12 percent of $Na_2O$, and 48 percent of $SiO_2$ and of different diameters were treated in a molten salt bath of potassium nitrate at a temperature of 460° C. for a long time to cause ion exchange and thereby to produce glass rods with excellent lens action. These glass rods were then heated and stretched in accordance with the invention to produce elongated It is apparent from Table 1 that the refractive indexes at the center and at the outer surfaces of the glass structures prior to the process are amply preserved after the process.

It was also found that the heating and stretching process did not give rise to double refraction within any of the glass structures such as to impair the lens action thereof. Moreover, with the above set forth glass composition, there was no devitrification due to the process, and no increase in light transmission loss due to devitrification was observable.

By selectively choosing the speed of heating and stretching during the process of the invention, it is readily possible to produce a light-conducting structure in which the diameter and the refractive index gradient vary in the longitudinal direction of the structure as, for example, a light conducting structure of tapered shape. Since a flux of light can be expanded at the wide part of light-conducting glass structure of tapered shape, such a structure can be advantageously used in the connection parts of light-conducting paths and in image magnification parts.

Another advantageous feature of the process of the invention is that it is readily possible to produce a glass-fiber laser element having a fine diameter in which the refractive index decreases progressively from the center outward toward the periphery. Such a laser element is particularly advantageous when used as an amplifier element in communication by laser light based on the same active substance because there is no phase distortion.

Still, another feature of the invention is that it affords the production, from a single transparent filament having a certain refractive index gradient, of light-conducting structures having various desired gradients of refractive index which are higher than the gradient of the single filament. This refractive index gradient can be represented by the constant $a$ in Equation 2 set forth hereinbefore, and the value of this constant a determines the value of the optimum spot size, the focal length of a lens, and other light-conducting characteristics.

The fibrous transparent structure to be treated by the process of the invention is not necessarily restricted to a single fiber but may be used in the form of a structure formed by bundling together a plurality of fibers with a light-absorbent glass structure and other substances interposed therebetween and causing the resulting bundle to be fusion bonded together.

A light-conducting filament structure produced in the above described manner according to the invention is, in itself, highly useful, but it may be made even more effective by a treatment of the invention in another aspect thereof as described below.

A light-conducting glass rod or filament having the aforedescribed distribution of refractive index, which is to constitute a core component, may be prepared by the process set forth in the afore-mentioned patent application or by any other suitable process. A tubular structure, which is to constitute a covering layer or sheath component, is prepared from a thermoplastic material which is ordinarily glass. This tubular structure has a softening temperature which is approximately equal to or lower than that of the core glass structure and the inner diameter of the tubular structure is preferably slightly larger than the diameter of the core glass structure.

The core glass structure is inserted into the tubular structure, and at least one end of the tubular structure is connected to an evacuating device such as a vacuum pump. When only one end is thus connected, the other end is sealed. The interior of the tubular structure is then continually evacuated while same is passed into a heating furnace and heated to a temperature above the softening temperature thereof. Alternatively, the tubular structure may be sealed beforehand at both ends as the interior thereof is maintained in an evacuated state and then the tubular structure is heated to the temperature above the softening temperature.

As the tubular structure is thus heated, it is stretched by means such as rolls or a weight whereupon the tubular structure contracts and reduces in diameter and is caused to adhere tightly to the core structure. In this stretching process, it is possible, when necessary, to stretch also the core glass structure to thereby impart a steeper gradient of refractive index to the core structure or to reduce the core structure diameter to an extent whereby the structure is caused to have great flexibility.

In the case where the contracting pressure due to the tensile force applied by rolls or a weight is insufficient for tight adhesion of the concentric structure, the structures can be heated, for example, in a hermetically sealed furnace into which heated compressed air is supplied to augment the contracting pressure. It has been bound, however, that tight adhesion between the concentric structure can be obtained without creating a pressure difference between the exterior and interior of the tubular structure by providing an extremely small clearance of tolerance, e.g. 0.1 mm. or less, between the diameter of the core structure and the inner diameter of the tubular structure.

By this process of the invention, a light-conducting glass structure having a covering layer can be accurately and easily produced, and, moreovr, the thickness of the covering layer can also be easily controlled. The formation of this covering layer in the above-described manner affords numerous advantageous results, the most important of which are as follows.

By providing the cover layer on a light-conducting glass structure fabricated by the process described in the aforementioned patent application, for example, the aforementioned minute faults on the surface of the glass core structure due to the immersion in the molten salt bath are eliminated by the fusion bonding of the covering glass layer, whereby the strength of the glass core structure is restored.

Furthermore, when the light-conducting glass structure has a slightly deficient chemical durability, its durability with respect to a long period of practical use can be improved by providing therearound a covering layer having an amply high chemical durability.

Another advantageious feature of the invention is that it is readily possible to provide a light-insulating layer at the outer surface of a light-conducting glass structure having a refractive index distribution represented by Equation 2 as set forth hereinbefore, whereby lowering the image contrast which would otherwise occur during image conduction is fully prevented.

Still another feature of the invention is that, by providing respective covering layers on the outer surfaces of a larger number of light-conducting structures each having a refractive index distribution conforming to the above-mentioned Equation 2 and fusion bonding the covering layers to each other, it is possible to form a structure capable of functioning as an ommateal lens. By using a thermoplastic material having a lower softening temperature than the light-conducting glass structure to form the covering layers in this process, it is possible to attain a temperature at which the thermoplastic material of the cover softens but the core structure does not so that a larger number of the covered structures can be fusion bonded to each other without impairment of the lens function of the core structures.

It has also been found that a new ommateal lens of excellent quality can be produced by cutting off a section of the bundled together light-conducting structures to the required length and polishing the surfaces of the cut ends.

A further advantageous feature of the light-conducting glass structure having a covering layer and produced by the process of the invention is that when this structure is subjected to a thermochemical treatment, a light-conducting glass structure of extremely high mechanical strength can be obtained. More specifically, by covering the outer surface of a light-conducting glass body having a refractive index distribution conforming to Equation 2 with a glass containing ions of an alkaline metal of relatively small ion radius as, for example, $Na^+$ ions, and immersing the resulting glass structure for a long time in a molten salt containing ions of an alkaline metal of relatively large ion radius, as, for example, $K^+$ ions, at a temperature in the vicinity of the transition temperature of the glass, it is possible to produce a compressive stress on the surface of the covering glass layer. This is well known as a technique for thermochemically strengthening glass.

While tensile stress is produced within the glass together with the development of this compressive stress, this tensile stress does not reach the core part of the structure used for light conduction and consequently the tensile stress does not impair the light-conducting property.

The speed of diffusion within the glass of the ions establishing the refractive index distribution, for example, the $Tl^+$ ions, is considerably lower than that of other alkaline metal ions at the transition temperature. Therefore, there is no variation in the refractive index distribution occurring in the core part of light-conducting glass body during the thermochemical treatment and a light-conducting glass structure of amply high strength can be produced.

By the practice of the present invention, furthermore, an improved glass laser element with a covering layer having, for example, the capability of absorbing light of superfluous wavelengths can be readily produced.

An additional feature of the process of the invention is that the time required for fusion bonding is relatively short, and, moreover, the speed of diffusion within the glass of the ions establishing the refractive index distribution is low, whereby the effect of the refractive index distribution on the light conducting glass body of the core part can be neglected. Furthermore, by heating and stretching both the core light-conducting glass body together with the tubular structure during the process of forming the covering layer on the core body, the cross sectional area of the core body is contracted whereby a core body with an even steeper refractive index gradient can be produced.

Stresses which readily develop in the core body when it is covered by a glass covering layer can be prevented by selecting a glass for the covering layer having a coefficient of thermal expansion which is sufficiently close to that of the core structure.

In order to disclose still more fully the nature and utility of the invention, the following examples of practice illustrating preferred embodiments of the invention and results are set forth, it being understood that these examples are presented as illustrative only, and that they are not intended to limit the scope of the invention.

EXAMPLE 1

A glass rod of 1 mm. diameter and 2 meter length and having a composition, by weight, of 48 percent of $SiO_2$, 12 percent of $Na_2O$, 16 percent of $Tl_2O$, and 24 percent of PbO was prepared and immersed for 200 hours in a potassium nitrate bath at a temperature of 460° C. As a result, there was obtained a glass rod having a refractive index $N_o$ at its center axis of 1.601, a refractive index at its outer surface of 1.576, and a refractive index $n$ in the interior along a transverse cross-section of the rod conforming substantially to a distribution represented by the equation $n = N_o(1-ar^2)$, wherein $a = 0.061$ mm.$^{-2}$.

Next, this glass rod was heated and stretched by means of the apparatus shown in FIG. 1. During this operation, the glass rod 1 was fed in its longitudinal direction by means of the feed mechanism 3 at a constant speed of 11 cm. per minute into the furnace 2, which was maintained at a temperature of 900° C. The part of the moving glass rod 1 within this furnace 2 was locally heated thereby and stretched into a filament, being wound up around a take-up drum 4 having a diameter of 265 mm. and rotating at 1.5 rpm., whereupon a filament of 300 micron diameter and a length of approximately 20 meters was obtained.

The refractive index distribution in a transverse cross-section of this filament was measured and found to be such that, as indicated in FIG. 4, the refractive index $N'_o$ at the center was 1.599, that at the outer surface was 1.580, and the distribution of the refractive index $n$ in the interior conformed substantially to the relationship $n = N'_o(1-ar^2)$, wherein $a = 0.53$ mm.$^{-2}$.

Next, the above described procedure was carried out as the glass rod 1 was fed at a speed of 1.5 cm. per minute, and the take-up drum 4 was rotated at 1.8 rpm., all other conditions being the same as before, whereupon the glass filament of a diameter of 100 microns and a length of approximately 200 meters was obtained.

The refractive index distribution in a cross-section of this filament was measured and found to be such that the refractive index $N'_o$ at the center was 1.599, that at the outer surface was 1.580, and the distribution of the refractive index $n$ in the interior conformed substantially to the relationship $n = No'(1-ar^2)$, wherein $a = 4.75$ mm.$^{-2}$.

EXAMPLE 2

Figure 6:
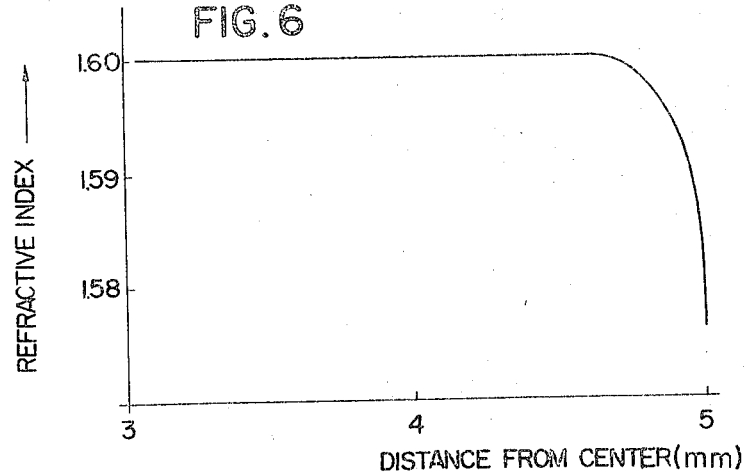

A glass rod of a composition, by weight, of 48 percent of $SiO_2$, 12 percent of $Na_2O$, 16 percent of $Tl_2O$, and 24 percent of PbO and a 10 mm. diameter and 1 meter length was prepared and then immersed for 10 hours in a potassium nitrate bath at a temperature of 460° C, whereupon a glass rod of a refractive index of 1.576 at its outer surface and 1.601 at its center as indicated in FIG. 6 was obtained. At indicated in FIG. 6, this glass rod has a refractive index gradient in a layer of approximately 0.3 mm. thickness located inward from its outer surface.

Next, this glass rod was heated and stretched by means of the apparatus shown in FIG. 1, the glass rod 1 being fed in its axial direction by the feed mechanism 3 at a constant speed of 1.1 cm. per minute into the furnace 2 maintained at a temperature of 850° C. The glass was thereby heated and stretched into a filament, being wound up around a take-up drum 4 of 400 mm. diameter and rotating at approximately 88 rpm., whereupon a filament of a diameter of 100 microns and a length of some thousands of meters was obtained.

The refractive index distribution in a transverse cross-section of this filament was measured and found to be such that, as indicated in FIG. 7, the refractive index was 1.577 and at the outer surface and exhibited a refractive index gradient in a surface layer of approximately 3 micron thickness, the refractive index in other regions being constant at 1.600.

It was found that this glass filament has an aperture angle of approximately 32°, and that incident light introduced into the filament at an angle within the limit of this aperture angle advanced through the filament without reflection. It was found further that this glass filament had a light transmittance of approximately 90 percent per meter of length, which is approximately 10 percent higher than the transmittance of approximately 80 percent of an optical filament of known clad type which is composed of a glass having a light absorption coefficient substantially equal to that of the glass material of the above described glass filament of the instant example, and in which total reflection is utilized to conduct light.

EXAMPLE 3

A glass rod of a composition by weight of 16 percent of $Tl_2O$, 24 percent of PbO, 12 percent of $Na_2O$, and 48 percent of $SiO_2$ and of a diameter of 1 mm. was immersed for approximately 2 weeks in a molten salt bath of potassium nitrate at 450° C, whereupon there as obtained a light-conducting glass rod having a refractive index in a cross-section thereof of 1.60 at a center of a value N at a distance $r$ from the center which could be substantially approximated by the equation $N=1.60(1-ar^2)$, wherein $a$ 7.5 cm.$^{-2}$.

Separately, a light-absorbent glass tube of a composition, by weight of 16 percent of $Tll_2O$, 22 percent of PbO, 0.8 percent of CoO, 1.5 percent of NiO, 12 percent of $Na_2O$, and 48 percent of $SiO_2$ and of an inner diameter of 1.2 mm. and an outer diameter of 1.5 mm. was prepared. The aforedescribed light-conducting glass rod was inserted into this glass tube, and then, after the tube interior was evacuated, the two ends thereof were hermetically sealed.

Next, the glass structure thus assembled was fed at a speed of 50 mm. per minute under tension through a furnace similar to that shown in FIG. 1 which was maintained at a temperature of 650° C. As indicated best in FIG. 5, this glass structure 12 consisting of the glass rod body 10 and the glass tube 11 was fed into the furnace 13 and was thereby heated so that the rod body 10 and the tube 11 were fusion together. At the same time, the glass thus bonded was stretched in the arrow direction by the tensile force. The resulting thin glass rod was drawn out of the furnace at a speed of approximately 200 mm. per minute. Thus, a glass rod comprising a core portion of a diameter of 0.5 mm. and a convering layer of an outer diameter of 0.65 mm. was obtained.

The refractive index distribution within this glass rod was found to be such that the refractive index at the center was 1.60 and the refractive index N at a distance of $r$ from the center was found to conform substantially to the equation $N = 1.60(1-ar^2)$, wherein $a = 30$ cm.$^{-2}$.

The two ends of this glass rod were polished to surfaces perpendicular to the rod axis whereby a lens having excellent lens performance was obtained and lens was found to have a very small lowering of image contrast.

EXAMPLE 4

A glass rod composed, by weight, of 16 percent of $Tl_2O$, 24 percent of PbO, 12 percent of $Na_2O$, and 48 percent of $SiO_2$ and having a diameter of 1 mm. was immersed for approximately two weeks in a molten salt bath of potassium nitrate at 450° C, whereupon a light-conducting glass rod was obtained having a refractive index distribution in a transverse cross-section thereof such that the refractive index at the center was 1.60, and the refractive index N at a distance $r$ from the center could be substantially approximated by the equation $N=1.60(1-ar^2)$, wherein $a = 7.5$ cm.$^{-2}$.

Separately, a light-absorbent glass tube composed, by weight, of 41 percent of $SiO_2$, 5.5 percent of $Na_2O$, 4.5 percent of $K_2O$, 47 percent of PbO, 0.5 percent of CoO, and 1.5 percent of NiO and having an inner diameter of 1.2 mm. and an outer diameter of 1.6 mm. was prepared. The aforedescribed light-conducting glass rod was inserted into this glass tube, and after the tube interior was evacutaed, the two ends thereof were hermetically sealed.

The glass structure thus assembled was passed through an electric furnace maintained at 600° C, and stretched similarly as in Example 3, whereupon the glass rod and tube were fusion bonded together at their interface, and a glass rod having a core portion of a diameter of 0.5 mm. and a covering layer portion of an outer diameter of 0.6 mm. was obtained.

This glass rod was cut into a large number of pieces, which were then disposed in parallel with each other and formed into a bundle which was then heated at 550° C, under a peripheral compressive force in an evacuated vessel, whereupon an integral glass structure of glass rods adhering firmly to each other was obtained.

The glass structure was gound and polished into a light-conducting structure of a length of 5 mm., which was found to be an excellent ommateal lens comprising light-conducting rods each having a focal length of 1.73 mm.

EXAMPLE 5

A glass rod composed, by weight, of 16 percent of $Tl_2O$, 24 percent of PbO, 12 percent of $Na_2O$, and 48 percent of $SiO_2$ and having a diameter of 1 mm. was immersed for approximately 2 weeks in a molten salt bath of potassium nitrate at 450° C, whereupon a light-conducting rod having in a transverse cross-section thereof a refractive index of 1.60 at the center and a refractive index N at a distance $r$ from the center which could be approximated by the equation $N = 1.60(1-ar^2)$, wherein $a = 7.5$ cm.$^{-2}$, was obtained.

Separately, a glass tube having the same composition as the above described glass rod and having an inner diameter of 1.2 mm. and an outer diameter of 1.4 was prepared. Into this glass tube, the above described glass rod was inserted, and, after the tube interior was evacuated, the two ends thereof were hermetically sealed.

The glass structure thus assembled was passed through a furnace maintained at 650° C, and was thus stretched into a covered glass filament consisting of a core portion of a diameter of 1.20 mm. and a covering layer portion of an outer diameter of 0.24 mm. This covered glass filament was then immersed in a molten salt bath of potassium nitrate at 370° C. for approximately 16 hours and thereafter withdrawn from the bath.

As a result, a compressive stress layer was formed on the glass filament surface, and the bending strength of the filament was remarkably increased. The filament was found to withstandbending to a radius of curvature of 5 cm. When laser light was introduced as incident light, as itw as mode matched into this filament, it was conducted through the filament while undergoing repeated internal refraction therewithin even when the filament was bent to a radius of curvature of 5 cm.

What we claim is:

1. A method of producing a light-conducting glass fiber from a glass rod comprising: providing a glass rod having a given length, a center axis, a given diameter and having a refractive index distribution in any cross-section thereof perpendicular to said center axis progressively decreasing from the center of said glass rod to the periphery thereof in accordance with the equation $n = n_o(1-ar^2)$ wherein $n$ represents the refractive index at a radial distance $r$ from said center axis, $n_o$ represents the refractive index at said center axis, and $a$ is a positive constant; longitudinally advancing said glass rod through a treating zone by advancing said glass rod into said treating zone at a given speed and withdrawing said glass rod from said treating zone at a speed greater than said given speed to thereby apply a tensile force to said glass rod in the longitudinal direction thereof; and heating said glass rod during advancement thereof through said treating zone to a temperature sufficient to render said glass rod plastically deformable during application of said tensile force to the plastically deformable glass rod to effect longitudinal stretching of said glass rod into a glass fiber having said center axis, a length substantially longer than said given length, a diameter smaller than said given diameter and having a refractive index distribution substantially in accordance with said equation wherein the positive constant $a$ has an increased value after said stretching as compared with its value prior to said stretching.

2. A method according to claim 1; wherein said advancing step comprises longitudinally advancing said glass rod at a predetermined constant speed into said treating zone and withdrawing said glass rod at a higher predetermined constant speed from said treating zone to thereby continuously apply a constant tensile force to said plastically deformable glass rod of sufficient strength to stretch said glass rod into said glass fiber.

3. A method according to claim 1; wherein the length of said glass fiber is at least 10 times greater than said given length of said rod.

4. A method according to claim 1; including providing a glass tube having a diameter no less than said given diameter; concentrically disposing said glass rod within said glass tube to form a glass composite prior to said advancing step; said advancing step comprising longitudinally advancing said glass composite through said treating zone while applying said tensile force thereto; and wherein said heating step includes heating said glass composite to a temperature sufficient to render both said glass tube and glass rod plastically deformable to effect longitudinal stretching of the plastically deformable composite into said glass fiber having exteriorly disposed therearound and adhered thereto a protective coating composed of said glass tube.

5. A method according to claim 4; including maintaining the space existing between the concentrically disposed glass rod and glass tube under vacuum during said heating and stretching to facilitate their bonding together.

6. A method of producing a light-conducting glass fiber from a glass rod comprising: providing a glass rod having a given length, a center axis, a given diameter, and having as viewed in any cross-section thereof perpendicular to said center axis a given refractive index $n_o$ at said center axis, a given refractive index $n_1$ at the outer periphery and a given refractive index gradient between $n_o$ and $n_1$; longitudinally advancing said glass rod through a treating zone by advancing said glass rod into said treating zone at a given speed and withdrawing said glass rod from said treating zone at a speed greater said given speed to thereby apply a tensile force to said glass rod in the longitudinal direction thereof; and heating said glass rod during advancement thereof through said treating zone to a temperature sufficient to render said glass rod plastically deformable during application of said tensile force to the plastically deformable glass rod to effect longitudinal stretching of said glass rod into a glass fiber having said center axis, a length substantially longer than said given length, a diameter smaller than said given diameter, and having a refractive index value at said center axis substantially equal to said given refractive index $n_o$, a refractive index value at the outer periphery substantially equal to said given refractive index $n_1$ and a refractive index gradient index steeper than said refractive index gradient.

7. A method according to claim 6; wherein said advancing step comprises longitudinally advancing said glass rod at a predetermined constant speed into said treating zone and withdrawing said glass rod at a higher predetermined constant speed from said treating zone to thereby a constant tensile force to said plastically deformable glass rod of sufficient strength to stretch said glass rod into said glass fiber.

8. A method according to claim 6; including providing a glass tube having a diameter no less than said given diameter; concentrically disposing said glass rod within said glass tube to form a glass composite prior to said advancing step; said advancing step comprising longitudinally advancing said glass composite through said treating zone while applying said tensile force thereto; and wherein said heating step includes heating said glass composite to a temperature sufficient to render both said glass tube and glass rod plastically deformable to effect longitudinal stretching of the plastically deformable composite into said glass fiber having exteriorly disposed therearound and adhered thereto a protective coating composed of said glass tube.

9. A method according to claim 8; including maintaining the spaced existing between the concentrically dispsoed glass rod and glass tube under vacuum during said heating and stretching to facilitate their bonding together.

10. A method according to claim 6; wherein the length of said glass fiber is at least 10 times greater than said given length of said glass rod.

* * * * *